United States Patent
Nakamura et al.

(10) Patent No.: US 7,511,082 B2
(45) Date of Patent: Mar. 31, 2009

(54) POLYURETHANE FOAM AND METHOD OF MANUFACTURING THE SAME

(75) Inventors: Keisuke Nakamura, Ibaraki (JP); Masaaki Takagi, Osaka (JP)

(73) Assignee: Yukigaya Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 10/912,053

(22) Filed: Aug. 6, 2004

(65) Prior Publication Data
US 2005/0065225 A1 Mar. 24, 2005

(30) Foreign Application Priority Data
Aug. 9, 2003 (JP) .............. 2003-320380

(51) Int. Cl.
*C08G 18/28* (2006.01)
(52) U.S. Cl. ............... 521/172; 521/134; 521/137; 521/170; 521/174; 264/51
(58) Field of Classification Search .......... 521/172, 521/134, 170, 137, 174; 264/51
See application file for complete search history.

(56) References Cited

U.S. PATENT DOCUMENTS

| | | | | |
|---|---|---|---|---|
| 3,637,909 A | * | 1/1972 | von Bonin et al. | 528/75 |
| 4,713,399 A | * | 12/1987 | Webb et al. | 521/110 |
| 4,978,691 A | | 12/1990 | Murai et al. | |
| 5,070,172 A | * | 12/1991 | Hirai et al. | 528/76 |
| 6,593,419 B2 | * | 7/2003 | Tanaka et al. | 524/589 |

OTHER PUBLICATIONS

Kuraray Polyol Series catalogue, pp. 7-8 and 73 (Oct. 1, 2002).

* cited by examiner

*Primary Examiner*—John Cooney
(74) *Attorney, Agent, or Firm*—Novak Druce + Quigg LLP

(57) ABSTRACT

The invention provides a polyurethane foam manufactured from a polyisocyanate and a polycarbonate polyol. Moreover, the invention provides a method of manufacturing the polyurethane foam manufactured from a polyisocyanate and a polycarbonate polyol, comprising mixing the polyisocyanate and polycarbonate polyol together and foaming same.

27 Claims, No Drawings

POLYURETHANE FOAM AND METHOD OF MANUFACTURING THE SAME

This claims priority from Japanese patent application JP 2003-320380 filed Aug. 9, 2003, incorporated herein by reference.

BACKGROUND OF THE INVENTION

1. Field of the Invention

The present invention relates to a polyurethane foam and a method of manufacturing the same, and in particular relates to a polyurethane foam used in washing implements, cosmetic puffs, filters, sealing materials, cushioning materials, damper materials and sound-absorbing materials, and a method of manufacturing the same.

2. Description of the Related Art

From hitherto, polyurethane foams have been widely used in washing implements, cushioning materials, industrial materials and so on. Such polyurethane foams are obtained by foaming the reaction product between a polyisocyanate and a polymer polyol. As such polyurethane foams, polyether type polyurethane foams in which a polyether polyol is used as the polymer polyol, and polyester type polyurethane foams in which a polyester polyol is used as the polymer polyol are known. Of these, polyether type polyurethane foams are relatively inexpensive, and are used in many ways.

However, such polyurethane foams are hydrolyzable. Hydrolyzability is a phenomenon in which macromolecules are decomposed by water; hydrolysis is accelerated under high-temperature high-humidity conditions, and results in a drop in strength, discoloration, a drop in volume and so on, and in severe cases disintegration. Due to hydrolysis, according to environmental tests as described later, the retention rate of the tensile strength and the elongation between before and after the test is 65% or less, and in severe cases the foam breaks easily and cannot even be handled Moreover, such polyurethane foams may be degraded by heat or ultraviolet radiation. As a result, such degradation occurs during use outside or under a high-humidity environment, and hence such use is not possible. Moreover, there is a problem known as 'gas yellowing' in which discoloration to a yellow color occurs during use through gases such as NOx. Moreover, there is a problem in that the heat resistance as represented by the compression set is not sufficient, and with packing and so on, in the case of being compressed for a long period at high temperature, the compressive stress drops, and recovery does not readily occur.

There are thus calls for polyurethane foams that are excellent in terms of hydrolysis resistance, light resistance, yellowing resistance and heat resistance, and have high strength.

SUMMARY OF THE INVENTION

The present invention resolves such drawbacks of the prior art; it is an object of the present invention to provide a polyurethane foam that is excellent in terms of hydrolysis resistance, UV resistance and yellowing resistance, is heat-resistant, can be thermoformed, has excellent heat resistance and light resistance, and has high strength, and a method of manufacturing the same.

Focusing on the excellence of the hydrolysis resistance of polyurethanes that are the reaction product between a polyisocyanate and a polycarbonate polyol, the present invention was accomplished as a result of assiduous studies into making such a polyurethane into a porous material. The invention provides a polyurethane foam manufactured from a polyisocyanate and a polycarbonate polyol.

The present invention may also provide the polyurethane foam manufactured from a polyisocyanate and a polycarbonate polyol, wherein a polymer polyol composition containing the polycarbonate polyol is liquid. Moreover, the present invention may also provide the polyurethane foam manufactured from a polyisocyanate and a polycarbonate polyol, wherein the polycarbonate polyol is a polymer polyol produced from a monomer having 3 to 13 carbon atoms.

The present invention may also provide the polyurethane foam manufactured from a polyisocyanate and a polycarbonate polyol, having a 55° C. 25% compression set according to JIS of not more than 30%. Moreover, the present invention may also provide the polyurethane foam manufactured from a polyisocyanate and a polycarbonate polyol, having a tensile strength retention rate after an environmental test at 70° C. and 90% RH of at least 70%.

The present invention may also provide the polyurethane foam manufactured from a polyisocyanate and a polycarbonate polyol, wherein the polyurethane foam can be thermoformed at 220° C. or less.

Moreover, the invention provides a method of manufacturing the polyurethane foam manufactured from a polyisocyanate and a polycarbonate polyol, comprising stirring and mixing the polyisocyanate and polycarbonate polyol together and foaming same.

Furthermore, the invention may provide a method of manufacturing the polyurethane foam manufactured from a polyisocyanate and a polycarbonate polyol, comprising mixing the polyisocyanate and polycarbonate polyol together at high pressure and foaming same.

DESCRIPTION OF THE PREFERRED EMBODIMENTS

In the present invention, 'polyurethane foam' means a porous material obtained from a polyurethane that is the reaction product between a polyisocyanate and at least one polymer polyol.

The polyisocyanate in the present invention is a material having on average at least two isocyanate groups per molecule, with the isocyanate groups being bonded to aromatic or aliphatic carbon atoms. Preferable aromatic isocyanates are, for example, 2,4- or 2,6-toluene diisocyanate, diphenylmethane diisocyanate (hereinafter referred to as 'MDI'), p-phenylene diisocyanate, polymethylene polyphenyl polyisocyanate (hereinafter referred to as 'polymeric MDI'), and mixtures thereof.

Moreover, MDI and a prepolymer of the MDI or a quasi-prepolymer derivative can also be used. Examples of particularly preferable aliphatic isocyanates are hydrogenated derivatives of the above aromatic isocyanates, hexamethylene diisocyanate, isophorone diisocyanate, and cyclohexane diisocyanate. A particularly preferable polyisocyanate is polymeric MDI.

The polyisocyanate is reacted in a proportion of 0.7 to 5, preferably 0.8 to 1.5, more preferably 0.95 to 1.2, isocyanate groups per equivalent of active hydrogens in the polymer polyol(s). Moreover, in the case of using water as a blowing agent, described later, the polyisocyanate is used with the amount thereof increased by a proportion of 0.7 to 5, preferably 0.8 to 1.5, isocyanate groups per equivalent of active hydrogens in the water.

Each polymer polyol is one having on average at least two hydroxyl groups per molecule, for example a polymer diol having two hydroxyl groups in the molecule thereof, or a polymer triol having three hydroxyl groups in the molecule thereof. Polycarbonate polyol(s) can be used as polymer polyol(s). Moreover, a polyether polyol or a polyester polyol can be used together with the polycarbonate polyol(s) as a polymer polyol.

The polymer polyol composition containing the polycarbonate polyol(s) is preferably liquid; the polymer polyol composition, which has mixed therein various auxiliaries as described later, is liquid from 20° C. to 60° C., which is the foam molding temperature, more preferably from 25° C. to 50° C., yet more preferably from 30° C. to 45° C. As a result, the polymer polyol composition is suitable for the foaming methods described later. The viscosity of the polymer polyol composition at the molding temperature is preferably not more than 10000 mPa·sec, more preferably not more than 7000 mPa·sec in the case of mixing and stirring as described later. Moreover, in the case of high-pressure mixing as described later, use is possible at a viscosity above 10000 mPa·sec, with not more than 20000 mPa·sec being preferable, and not more than 15000 mPa·sec being more preferable. There is no particular lower limit.

Examples of polycarbonate polyols include polycarbonate diols having two hydroxyl groups per molecule, and polycarbonate triols, polycarbonate tetraols or the like having three or more hydroxyl groups per molecule. Such a polycarbonate polyol is produced from at least one monomer through carbonate bonding. A diol can be used as a monomer. As the method of producing carbonate bonds using a diol, for example synthesis can be carried out by subjecting the diol and a carbonate ester to transesterification.

There are no particular limitations on the carbonate ester, but examples include dimethyl carbonate, diethyl carbonate and diphenyl carbonate. These may be used alone, or two or more may be used together.

As a monomer for producing the polycarbonate polyol, any of various diols can be used, with examples being aliphatic diols having an aliphatic hydrocarbon as a backbone thereof. Preferable diols are ones in which the backbone hydrocarbon has from 3 to 13, more preferably from 4 to 11, carbon atoms. Moreover, a monomer having a branched hydrocarbon as the backbone thereof is more preferable than one having a straight chain hydrocarbon as the backbone thereof since the viscosity of the polycarbonate polyol produced can be reduced.

Examples of such diols include 3-methyl-1,5-pentanediol (MPD), 1,6-hexanediol (HD), 2-methyl-1,8-octanediol (MOD), 1,9-nonanediol (ND), 1,4-butanediol, and cyclohexanedimethanol.

These may be used alone, or two or more may be used together. Of the above, it is particularly preferable to use ND and MOD together, or use HD and MPD together, since the polycarbonate polyol produced will be liquid.

By using ND and MOD in an ND:MOD ratio of from 80:20 to 5:95, the polycarbonate polyol produced can be made to be liquid; this ratio is more preferably from 65:35 to 10:90.

Moreover, by using HD and MPD in an HD:MPD ratio of from 80:20 to 5:95, the polycarbonate polyol produced can be made to be liquid; this ratio is more preferably from 65:35 to 10:90.

With a polycarbonate diol as described above, by using a triol, a tetraol or the like in addition to the diol(s), a polycarbonate triol, polycarbonate tetraol or the like having three or more hydroxyl groups per molecule can be synthesized.

The average molecular weight of each polycarbonate polyol is preferably from 1000 to 3000; in the case of a polycarbonate polyol having an average molecular weight in this range, a flexible polyurethane foam can be obtained, and moreover a liquid polyol is obtained. The number of hydroxyl groups in each polycarbonate polyol is at least 2, preferably from 2 to 4, particularly preferably from 2 to 3, per molecule on average. Such polycarbonate polyols can be used alone, or a plurality can be used in combination.

A particularly preferable combination is a combination of a polycarbonate polyol having two hydroxyl groups and a polycarbonate polyol having three hydroxyl groups, with the weight ratio of the polycarbonate polyol having two hydroxyl groups to the polycarbonate polyol having three hydroxyl groups being from 40:60 to 95:5, more preferably from 60:40 to 90:10. Through such a combination, the manufactured foam can be made to have excellent heat resistance. Such polycarbonate polyols are sold, for example, as Kuraray Polyol polycarbonate polyols by Kuraray Co., Ltd.

In the present invention, a polyether polyol can be used as a polymer polyol in addition to the polycarbonate polyol(s).

Polyether polyols are relatively inexpensive, and hence there is an effect of keeping down the price of the product. Moreover, polyether polyols have relatively low viscosity, and hence by using a polyether polyol in combination with the polycarbonate polyol(s), the viscosity of the polymer polyol component can be reduced.

Moreover, such a polyether polyol gives the polyurethane foam manufactured flexibility.

As such a polyether polyol, a polyether polyol used in polyether type polyurethane foams from hitherto can be used. Of such polyether polyols, polyethylene glycol and polypropylene glycol can be preferably used, since a flexible foam can be obtained. The average molecular weight of the polyether polyol is preferably from 500 to 5000.

The number of hydroxyl groups in the polyether polyol is at least 2, preferably from 2 to 4, particularly preferably from 2 to 3, per molecule on average. Such polyether polyols can be used alone, or a plurality can be used in combination.

The polyether polyol(s) can be used within a scope such that there is no impediment of the hydrolysis resistance, heat resistance, yellowing resistance and light resistance, which are objectives of the present invention; out of 100 parts by weight of the polymer polyols, the amount of the polyether polyol(s) is not more than 95 parts by weight, more preferably not more than 80 parts by weight, yet more preferably not more than 60 parts by weight. There is no particular lower limit on the amount used of the polyether polyol(s), but if this is not more than 30 parts by weight, then there is a merit in terms of price, and yet in terms of performance there is no longer any difference to when polycarbonate polyols are used alone.

In addition to the polyisocyanate and the polymer polyol(s), blowing agents, catalysts and foam stabilizers can be used in the polyurethane foam of the present invention.

As a blowing agent, water, a hydrocarbon, halogenated methane, or a mixture thereof is preferable. It is preferable to use water in an amount of from 0.5 to 10, preferably from 1 to 5 parts per 100 parts by weight of the polyol(s). It is preferable to use a hydrocarbon or a halogenated alkane in an amount of from 5 to 75 parts per 100 parts by weight of the polyol(s). Water is particularly preferable in that a foam having a continuous cell structure can be manufactured.

As catalysts, publicly known organometallic catalysts and tertiary amine compounds used in polyurethane foam manufacture can be used. As an organometallic catalyst, for example dibutyltin dilaurate is preferable. Any of various other catalysts such as tertiary amines, diazabicycloalkenes and salts thereof, and organometallic compounds can also be used mixed therein. Regarding the amount of the catalyst, 0.001 to 0.5 parts of an organometallic catalyst is used per 100 parts by weight of the polyol(s). It is preferable to use a tertiary amine in an amount in a range of 0.1 to 3 parts per 100 parts by weight of the polyol(s).

Examples of foam stabilizers are publicly known ones generally used in polyurethane foam manufacture. Examples are polydimethylsiloxane-polyalkylene oxide block polymers, and vinylsilane-polyalkylene polyol polymers.

The polyurethane foam of the present invention is manufactured by mixing together the polymer polyol(s), the blowing agent(s), the catalyst(s) and the foam stabilizer(s) to obtain a polymer polyol composition, and mixing the polymer polyol composition with the polyisocyanate and carrying out reaction therebetween, and at the same time generating a gas and thus carrying out foaming. Regarding the mixing, the polyisocyanate and the polymer polyol composition are preferably mixed together at from 20° C. to 60° C., more preferably from 25° C. to 50° C., yet more preferably from 30° C. to 45° C. If the temperature is too high, then the reaction will be fast and hence stable manufacture will not be possible, whereas if the temperature is too low, then the viscosity of the liquid will be high, and hence it will be difficult to carry out the mixing uniformly, and thus it will not be possible to manufacture a foam having a uniform cell structure.

The mixing is preferably carried out to uniformity, whereby uniform, minute cells can be formed. The mixing is preferably carried out in as short a time as possible, with the time from the two liquids being mixed together to casting being not more than 30 seconds, preferably not more than 10 seconds, more preferably not more than 5 seconds. A method in which the two liquids, i.e. the polyisocyanate and the polymer polyol composition, are supplied into a mixing chamber, mixed together, and discharged continuously is preferable.

As such a method, there is a stirring mixing method, with it being possible to use a mixing chamber equipped with stirring blades that rotate at high speed. It is preferable to rotate the stirring blades at high speed since then the mixing can be carried out rapidly and uniformly; a speed of at least 2000 rpm is preferable, with at least 3000 rpm being more preferable, and at least 5000 rpm being yet more preferable.

Moreover, another method which is more preferable is high-pressure mixing. High-pressure mixing is a method in which the two liquids are supplied at high pressure into a high-pressure mixer, and are thus made to collide with one another at high speed in a mixing chamber and are hence mixed together. By carrying out the mixing using this method, high-viscosity liquids can be mixed together, and hence the choice of materials that can be used is broadened. Moreover, the mixing can be carried out to uniformity in a short time, and uniform, minute cells can be formed.

Because the polyurethane foam of the present invention is manufactured from a polyisocyanate and polycarbonate polyol(s), the hydrolysis resistance is good, with it being possible to make the strength retention rate after an endurance test be at least 70%, preferably at least 80%. As the hydrolysis endurance test, an environmental test is carried out in which a sample is hung up in an environmental test chamber maintained at a temperature of 70° C. and a humidity of 90% and left for 8 weeks, the tensile strength is measured before and after the test, and the retention rate thereof is calculated. Thus, tensile strength retention rate (%) is defined as follows, where "TS" is tensile strength and "RH" is relative humidity: Tensile Strength Retention=((TS after 8 weeks at 70° C. and 90% RH)/(TS before 8 weeks at 70° C. and 90% RH))×100%.

Because the polyurethane foam of the present invention is manufactured from a polyisocyanate and polycarbonate polyol(s), the heat resistance is good, with it being possible to make the compression set be good. The 55° C. 25% compression set according to JIS K 6262 can be made to be not more than 30%, more preferably not more than 10%.

Because the polyurethane foam of the present invention is manufactured from a polyisocyanate and polycarbonate polyol(s), thermoforming is possible. Thermoforming is a molding method in which the polyurethane foam is compressed in a heated mold and thus molded, whereby the foam can be made fine, and curved surfaces can be formed. With thermoforming, if possible molding at low temperature is preferable in terms of thermal energy, and molding can be carried out in a short time. The polyurethane foam of the present invention has a thermoforming temperature of 220° C. or less, more preferably 200° C. or less. There is no restriction on the lower limit, but this is at least 170° C.

EXAMPLES

Example 1

The following two liquids were prepared.
Liquid A
Polyisocyanate
Mixture of 2,4-toluene diisocyanate and 2,6-toluene diisocyanate
    40 parts by weight
Viscosity at 40° C.: 100 mPa·sec
Liquid B Polymer polyol composition
Polymer polyols
(1) Polycarbonate diol having average molecular weight of 2000 and having 3-methyl-1,5-pentanediol and 1,6-hexanediol as monomers
    40 parts by weight
(2) Polycarbonate triol having average molecular weight of 3000 and having 3-methyl-1,5-pentanediol and 1,6-hexanediol as monomers
    10 parts by weight
(3) Polyether triol having average molecular weight of 3000
    50 parts by weight
(1) Polycarbonate polyol C-2050R made by Kuraray
(2) Polycarbonate polyol CF-1000 made by Kurara
(3) MN-3050BM made by Mitsui Takeda Chemicals, Inc.

| Blowing agent | |
| --- | --- |
| Water | 1 part by weight |
| Silicone foam stabilizer | 1 part by weight |
| Catalysts | |
| Amine catalyst | 0.1 parts by weight |
| Dibutyltin dilaurate | 0.1 parts by weight |

The polymer polyols, and the blowing agent, the foam stabilizer and the catalysts were mixed together to obtain liquid B.

Liquid B was liquid at 40° C., having a viscosity of 9000 mPa·sec.

Each of liquid A and liquid B were put at 40° C., and were then introduced into a continuous mixer having rotating stirring blades that rotate at 5000 rpm such that the liquid A to liquid B flow rate ratio was 4:10, and mixing and stirring were carried out. The mixing time was 5 seconds. After the mixing, the mixture was injected into a mold, and foaming was carried out, thus obtaining a polyurethane foam. The polyurethane foam obtained had a specific gravity of 0.11, and was soft and had rubber elasticity.

Upon molding this foam by compressing to half the thickness using a hot plate at any of various temperatures, molding was possible at 200° C. or above, and hence the thermoforming temperature was 200° C.

Examples 2 to 4

Manufacture was carried out as in Example 1, using each of the liquid B compositions in Table 1.

Example 5

The same was done as in Example 1, except that the mixing was carried out using a high-pressure mixer (polyurethane high-pressure injector made by Maruka Kakouki Co., Ltd.) instead of the mixer having rotating stirring blades. The polyisocyanate and the polymer polyol component were mixed together uniformly despite the high viscosity, and the polyurethane foam obtained was finer and more flexible than in Example 1.

Comparative Example 1

The polycarbonate diol and polycarbonate triol used in the Examples were replaced with the polyether triol having an average molecular weight of 3000, i.e. the amount of the polyether polyol was made to be 100 parts by weight. The mixing and stirring, the casting, and the molding were carried out as in Example 1.

The polyurethane foam obtained had a specific gravity of 0.11, and was soft and had rubber elasticity.

Hydrolysis Resistance, Heat Resistance

The hydrolysis resistance was tested for each of the Examples and the Comparative Example. Each foam was cut to a thickness of 5 mm, and was hung up in an environmental test chamber at 70° C. and 90% RH (relative humidity) and left for 8 weeks. The tensile strength was measured before and after this, and the retention rate was calculated. The compression set was also measured. The results are shown in Table 1.

retention rate was 65%, which was the lowest in the experiments, and results of 'discolors' and 'degrades' were obtained for the gas yellowing resistance and the UV degradation resistance.

The results for Examples 3 and 4 were thus somewhat poorer than for Examples 1, 2 and 5, and the results for Comparative Example 1 were much poorer than for Examples 1, 2 and 5.

From the above results, it became clear that polyurethane foams of the present invention are markedly superior in terms of hydrolysis resistance and heat resistance.

Thermoformability

The thermoformability was tested using the same samples as in the hydrolysis resistance tests. Each foam was cut to a thickness of 10 mm, compression was carried out for 60 minutes using a hot plate such that the thickness was halved, and the minimum temperature at which thermoforming was possible was determined. The results are shown in Table 1. The polyurethane foams of the present invention have a similar thermoformability to the conventional polyurethane foam.

Moreover, in Example 5 the stirring and mixing of Example 1 was changed to high-pressure mixing; more uniform mixing was achieved despite the high viscosity of the polymer polyol component, and the polyurethane foam

TABLE 1

| PORIKA | | Example 1 | Example 2 | Example 3 | Example 4 | Example 5 | Comparative Example 1 |
|---|---|---|---|---|---|---|---|
| A | Polyisocyanate | 40 | 40 | 40 | 40 | 40 | 40 |
| B | Polycarbonate diol | 40 | 50 | | | 40 | |
| | Polycarbonate triol | 10 | | 10 | 20 | 10 | |
| | Polyether triol | 50 | 50 | 90 | 80 | 50 | 100 |
| | Water | 1 | 1 | 1 | 1 | 1 | 1 |
| | Silicone foam stabilizer | 1 | 1 | 1 | 1 | 1 | 1 |
| | Amine catalyst | 0.1 | 0.1 | 0.1 | 0.1 | 0.1 | 0.1 |
| | Dibutyltin dilaurate | 0.1 | 0.1 | 0.1 | 0.1 | 0.1 | 0.1 |
| Liquid B | Viscosity | 9000 | 7000 | 900 | 1500 | 9000 | 500 |
| Mixer | | Stirring blade type | Stirring blade type | Stirring blade type | Stirring blade type | High pressure type | Stirring blade type |
| | Apparent specific gravity (g/cm$^3$) | 0.11 | 0.11 | 0.11 | 0.11 | 0.11 | 0.11 |
| | Tensile strength (kgf/cm$^2$) | 1.8 | 1.6 | 1.0 | 1.2 | 1.8 | 0.95 |
| | Elongation (%) | 150 | 140 | 210 | 200 | 180 | 220 |
| | 55° C. compression set (%) | 0.5 | 0.6 | 20 | 10 | 0.5 | 35 |
| | Hydrolysis resistance | | | | | | |
| | Tensile strength retention rate | 90% | 85% | 75% | 78% | 90% | 65% |
| | Gas yellowing resistance | Good | Good | Discolors slightly | Discolors slightly | Good | Discolors |
| | UV degradation resistance | Good | Good | Fairly good | Good | Good | Degrades |
| | Thermoforming temperature (° C.) | 200 | 200 | 180 | 180 | 190 | 170 |

For each of Examples 1, 2 and 5, the compression set, which indicates the heat resistance, was excellent at 5% or less, being 0.5%, 0.6% or 0.5%; moreover, the tensile strength retention rate, which indicates the hydrolysis resistance, was excellent, being 90% for each of Examples 1 and 5, and 85% for Example 2; furthermore, for each of Examples 1, 2 and 5, the result 'good' was obtained for each of the gas yellowing resistance and the UV degradation resistance.

On the other hand, for Examples 3 and 4, the amount used of the polyether polyol was high, and the results obtained were a high compression set of 20 or 10, a low tensile strength retention rate of 75% or 78%, and 'discolors slightly' and 'fairly good' or the like for the gas yellowing resistance and the UV degradation resistance. Furthermore, for the Comparative Example, the compression set was 35, which was even higher than for Examples 3 and 4, the tensile strength obtained was finer and more flexible than in Example 1. It was thus ascertained that high-pressure mixing is superior.

Measurement Methods

The measurement methods used in the present invention are as follows.

Viscosity: Viscosity at temperature of 40° C. using B type rotational viscometer Specific gravity: Apparent specific gravity obtained by cutting out rectangular parallelepiped and then calculating from weight and lengths of sides Tensile strength, elongation: Breaking strength using JIS K 6251 no. 1 dumbbell Compression set: 55° C. 25% compression set according to JIS K 6262

Gas yellowing: According to JIS L 0855

UV degradation: Irradiation test using xenon lamp; 20 hours of irradiation with Suntest XLS+ made by Atlas used Effects of the Invention As described in detail above, according to the present invention, there can be provided a polyurethane foam having excellent hydrolysis resistance and heat resistance, thus enabling use under high-temperature high-humidity conditions under which use has not been possible hitherto. Moreover, according to a manufacturing method of the present invention, such excellent polyurethane foam can be obtained.

What is claimed is:

1. A polyurethane foam, manufactured by simultaneously mixing and foaming a polymer polyol composition and polyisocyanate,
   wherein the polyisocyanate comprises 2,4-toluene diisocyanate and 2,6-toluene diisocyanate;
   wherein the polymer polyol composition comprises:
   at least one polycarbonate polyol comprising three hydroxyl groups which is a polymer produced from at least diol monomer, wherein the at least diol monomer from which the polycarbonate polyol comprising three hydroxyl groups is produced comprises 3-methyl-1,5-pentanediol and 1,6-hexanediol, and
   a polycarbonate diol having two hydroxyl it groups which is a polymer produced from at least diol monomer, wherein said at least diol monomer from which the polycarbonate diol is produced comprise at least one member selected from the group consisting of 3-methyl-1,5-pentanediol and 2-methyl-1,8-octanediol and optionally further comprise a member of the group consisting of 1,6-hexanediol and 1,9-nonanediol;
   with the weight ratio of the polycarbonate diol having two hydroxyl groups to the polycarbonate polyol having three hydroxyl groups being from 40:60 to 95:5,
   wherein the average molecular weight of the polycarbonate polyol is 3000 and the average molecular weight of the polycarbonate diol is 2000.

2. The polyurethane foam according to claim 1, wherein the at least diol monomer from which the polycarbonate diol is produced consists essentially of 3-methyl-1,5-pentanediol and 1,6-hexanediol.

3. The polyurethane foam according to claim 1, wherein the at least diol monomer from which the polycarbonate diol is produced consists essentially of 3-methyl-1,5-pentanediol.

4. The polyurethane foam according to claim 1, wherein the polymer polyol composition comprising the polycarbonate polyol is liquid having a viscosity of not more than 7000 mPa·sec.

5. The polyurethane foam according to claim 3, with the weight ratio of the polycarbonate diol comprising two hydroxyl groups to the polycarbonate polyol comprising three hydroxyl groups being from 60:40 to 90:10.

6. The polyurethane foam according to claim 1, having a 55° C. 25% compression set according to JIS K 6262 of not more than 30%.

7. The polyurethane foam according to claim 1, wherein the polyurethane foam is thermoformable at 220° C. or less.

8. The polyurethane foam according to claim 1, made from a mixture of the polyisocyanate and polymer polyol composition comprising at least one member selected from the group consisting of blowing agents, catalysts and foam stabilizers.

9. The polyurethane foam according to claim 1, wherein the polymer polyol composition further comprises a polyether polyol.

10. The polyurethane foam according to claim 1, with the weight ratio of the polycarbonate diol comprising two hydroxyl groups to the polycarbonate polyol comprising three hydroxyl groups being from 60:40 to 90:10.

11. The polyurethane foam according to claim 2, with the weight ratio of the polycarbonate diol comprising two hydroxyl groups to the polycarbonate polyol comprising three hydroxyl groups being from 60:40 to 90:10.

12. The polyurethane foam according to claim 1, wherein the at least diol monomer from which the polycarbonate diol is produced consists essentially of 2-methyl-1,8-octanediol.

13. The polyurethane foam according to claim 1, wherein the at least diol monomer from which the polycarbonate diol is produced consists essentially of 2-methyl-1,8-octanediol and 1,9-nonanediol.

14. The polyurethane foam according to claim 12, with the weight ratio of the polycarbonate diol comprising two hydroxyl groups to the polycarbonate polyol comprising three hydroxyl groups being from 60:40 to 90:10.

15. The polyurethane foam according to claim 13, with the weight ratio of the polycarbonate diol comprising two hydroxyl groups to the polycarbonate polyol comprising three hydroxyl groups being from 60:40 to 90:10.

16. A method of manufacturing the polyurethane foam according to claim 1, comprising stirring and mixing the polyisocyanate and the polymer polyol composition together to form a mixture, the polyol composition having a viscosity of not more than 10000 mPa·sec, and simultaneously foaming the mixture.

17. A method of manufacturing the polyurethane foam according to claim 16, wherein the polyisocyanate and the polymer polyol composition are mixed together at from 20° C. to 60° C.

18. A method of manufacturing the polyurethane foam according to claim 16, wherein the polyisocyanate and the polymer polyol composition are mixed together at from 25° C. to 50° C.

19. A method of manufacturing the polyurethane foam according to claim 1, comprising mixing by a high pressure mixing method the polyisocyanate and polymer polyol composition together to form a mixture, the polyol composition having a viscosity of not more than 20000 mPa·sec, and simultaneously foaming the mixture.

20. A method of manufacturing the polyurethane foam according to claim 19, wherein the polyisocyanate and the polymer polyol composition are mixed together at from 20° C. to 60° C.

21. A method of manufacturing the polyurethane foam according to claim 19, wherein the polyisocyanate and the polymer polyol composition are mixed together at from 25° C. to 50° C.

22. A method of manufacturing the polyurethane foam of claim 1, comprising
   simultaneously mixing and foaming the polymer polyol composition and polyisocyanate, and
   adding a hydrocarbon as a blowing agent.

23. A method of manufacturing the polyurethane foam according to claim 1, comprising stirring and mixing the polyisocyanate and the polymer polyol composition together to form a mixture, the polyol composition having a viscosity of not more than 7000 mPa·sec, and simultaneously foaming the mixture.

24. A method of manufacturing the polyurethane foam according to claim 16, wherein the stirring and mixing step comprises rotating stirring blades at a velocity of at least 2000 rpm.

25. A method of manufacturing the polyurethane foam according to claim 17, wherein the stirring and mixing step comprises rotating stirring blades at a velocity of at least 2000 rpm.

26. A method of manufacturing the polyurethane foam according to claim 1, comprising
simultaneously mixing and foaming the polymer polyol composition and polyisocyanate, and
adding at least one of organometallic catalysts, tertiary amine compounds and diazabicycloalkenes as a catalysts to the polymer polyol composition.

27. A method of manufacturing the polyurethane foam of claim 1, comprising
simultaneously mixing and foaming a polymer polyol composition and polyisocyanate, and
adding water as a blowing agent.

* * * * *

UNITED STATES PATENT AND TRADEMARK OFFICE
CERTIFICATE OF CORRECTION

| | |
|---|---|
| PATENT NO. | : 7,511,082 B2 |
| APPLICATION NO. | : 10/912053 |
| DATED | : March 31, 2009 |
| INVENTOR(S) | : Keisuke Nakamura et al. |

It is certified that error appears in the above-identified patent and that said Letters Patent is hereby corrected as shown below:

IN THE CLAIMS

Delete claim 1 Col. 9 lines 13-38 and substitute the claim 1 as follows:

1. A polyurethane foam, manufactured by simultaneously mixing and foaming a polymer polyol composition and polyisocyanate, wherein the polyisocyanate comprises 2,4-toluene diisocyanate and 2,6-toluene diisocyanate; wherein the polymer polyol composition comprises: at least one polycarbonate polyol comprising three hydroxyl groups which is a polymer produced from at least diol monomer, wherein the at least diol monomer from which the polycarbonate polyol comprising three hydroxyl groups is produced comprises 3-methyl-1,5-pentanediol and 1,6-hexanediol, and a polycarbonate diol having two hydroxyl [[it]] groups which is a polymer produced from at least diol monomer, wherein said at least diol monomer from which the polycarbonate diol is produced comprise at least one member selected from the group consisting of 3-methyl-1,5-pentanediol and 2-methyl-1,8-octanediol and optionally further comprise a

UNITED STATES PATENT AND TRADEMARK OFFICE
CERTIFICATE OF CORRECTION

PATENT NO. : 7,511,082 B2
APPLICATION NO. : 10/912053
DATED : March 31, 2009
INVENTOR(S) : Keisuke Nakamura et al.

It is certified that error appears in the above-identified patent and that said Letters Patent is hereby corrected as shown below:

member of the group consisting of 1,6-hexanediol and 1,9-nonanediol; with the weight ratio of the polycarbonate diol having two hydroxyl groups to the polycarbonate polyol having three hydroxyl groups being from 40:60 to 95:5, wherein the average molecular weight of the polycarbonate polyol is 3000 and the average molecular weight of the polycarbonate diol is 2000.

Signed and Sealed this

Thirteenth Day of October, 2009

David J. Kappos
*Director of the United States Patent and Trademark Office*